(12) United States Patent
Hung et al.

(10) Patent No.: US 9,221,688 B2
(45) Date of Patent: *Dec. 29, 2015

(54) PRODUCTION OF GRAPHENIC CARBON PARTICLES UTILIZING HYDROCARBON PRECURSOR MATERIALS

(71) Applicant: PPG Industries Ohio, Inc., Cleveland, OH (US)

(72) Inventors: Cheng-Hung Hung, Wexford, PA (US); Noel R. Vanier, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/348,280

(22) PCT Filed: Sep. 28, 2012

(86) PCT No.: PCT/US2012/057811
§ 371 (c)(1),
(2) Date: Mar. 28, 2014

(87) PCT Pub. No.: WO2013/049498
PCT Pub. Date: Apr. 4, 2013

(65) Prior Publication Data
US 2014/0227165 A1  Aug. 14, 2014
US 2015/0259211 A9  Sep. 17, 2015

Related U.S. Application Data

(63) Continuation-in-part of application No. 13/309,894, filed on Dec. 2, 2011, now Pat. No. 8,486,364, which is a continuation-in-part of application No. 13/249,315, filed on Sep. 30, 2011, now Pat. No. 8,486,363.

(51) Int. Cl.
C01B 31/04 (2006.01)
B82Y 30/00 (2011.01)
B82Y 40/00 (2011.01)

(52) U.S. Cl.
CPC ............. C01B 31/0446 (2013.01); B82Y 30/00 (2013.01); B82Y 40/00 (2013.01); C01B 2204/04 (2013.01);

(Continued)

(58) Field of Classification Search
CPC .... B82Y 40/00; B82Y 30/00; C01B 31/0446; C01B 2204/04; C01P 2002/01; C01P 2002/82; C01P 2004/04; C01P 2004/54; C01P 2004/62; C01P 2004/64; C01P 2006/12; C01P 2006/40; C01P 2004/24; C01P 2006/11
USPC .............. 423/445 R, 448; 204/157.43, 157.47
See application file for complete search history.

(56) References Cited

U.S. PATENT DOCUMENTS 4,851,262 A   7/1989  McFeaters
5,486,675 A   1/1996  Taylor et al.
(Continued)

FOREIGN PATENT DOCUMENTS

DE   102011003619 A1   8/2012
KR      20120029530 A   3/2012
(Continued)

OTHER PUBLICATIONS

Dresselhaus, et al., Science of Fullerenes and Carbon Nanotubes, pp. 60-79 (Academic Press 1996).*
(Continued)

Primary Examiner — Daniel C McCracken
(74) Attorney, Agent, or Firm — Alan G. Towner

(57) ABSTRACT

A method is disclosed for making graphenic carbon particles. The method includes introducing a hydrocarbon precursor material into a thermal zone (20), heating the hydrocarbon precursor material in the thermal zone to form the graphenic carbon particles from the hydrocarbon precursor material, and collecting the graphenic carbon particles. The hydrocarbon precursor material may comprise a hydrocarbon and/or methane capable of forming a two-carbon-fragment species. Apparatus (20) for performing such a method, and graphenic particles produced by the method, are also disclosed.

15 Claims, 16 Drawing Sheets

(52) U.S. Cl.
CPC ......... *C01P 2002/01* (2013.01); *C01P 2002/82* (2013.01); *C01P 2004/04* (2013.01); *C01P 2004/24* (2013.01); *C01P 2004/54* (2013.01); *C01P 2004/62* (2013.01); *C01P 2004/64* (2013.01); *C01P 2006/11* (2013.01); *C01P 2006/12* (2013.01); *C01P 2006/40* (2013.01)

(56) References Cited

U.S. PATENT DOCUMENTS

| | | | |
|---|---|---|---|
| 5,527,518 | A | 6/1996 | Lynum et al. |
| 5,749,937 | A | 5/1998 | Detering et al. |
| 5,788,738 | A | 8/1998 | Pirzada et al. |
| 5,851,507 | A | 12/1998 | Pirzada et al. |
| 5,935,293 | A | 8/1999 | Detering et al. |
| 5,984,997 | A | 11/1999 | Bickmore et al. |
| 5,989,648 | A | 11/1999 | Phillips |
| 6,099,696 | A * | 8/2000 | Schwob et al. ............... 204/173 |
| 6,228,904 | B1 | 5/2001 | Yadav et al. |
| 6,358,375 | B1 * | 3/2002 | Schwob ........................ 204/173 |
| RE37,853 | E | 9/2002 | Detering et al. |
| 6,652,967 | B2 | 11/2003 | Yadav et al. |
| 6,669,823 | B1 | 12/2003 | Sarkas et al. |
| 6,689,192 | B1 | 2/2004 | Phillips et al. |
| 6,716,525 | B1 | 4/2004 | Yadav et al. |
| 6,719,821 | B2 | 4/2004 | Yadav et al. |
| 6,786,950 | B2 | 9/2004 | Yadav et al. |
| 6,821,500 | B2 | 11/2004 | Fincke et al. |
| 6,830,822 | B2 | 12/2004 | Yadav |
| 6,849,109 | B2 | 2/2005 | Yadav et al. |
| 7,071,258 | B1 | 7/2006 | Jang et al. |
| 7,635,458 | B1 | 12/2009 | Hung et al. |
| 7,754,184 | B2 | 7/2010 | Mercuri |
| 7,776,303 | B2 | 8/2010 | Hung et al. |
| 7,785,492 | B1 | 8/2010 | Jang et al. |
| 7,790,285 | B2 | 9/2010 | Zhamu et al. |
| 7,824,741 | B2 | 11/2010 | Sandhu |
| 7,842,271 | B2 | 11/2010 | Petrik |
| 8,047,248 | B2 | 11/2011 | Prud'homme et al. |
| 8,486,363 | B2 * | 7/2013 | Hung et al. ................... 423/448 |
| 8,486,364 | B2 * | 7/2013 | Vanier et al. .................. 423/448 |
| 2002/0114949 | A1 | 8/2002 | Bower et al. |
| 2005/0271574 | A1 | 12/2005 | Jang et al. |
| 2006/0093885 | A1 | 5/2006 | Krusic et al. |
| 2006/0121279 | A1 | 6/2006 | Petrik |
| 2006/0216222 | A1 | 9/2006 | Jang |
| 2007/0045116 | A1 * | 3/2007 | Hung et al. ................... 204/471 |
| 2007/0237705 | A1 | 10/2007 | Itoh et al. |
| 2008/0206124 | A1 | 8/2008 | Jang et al. |
| 2009/0022649 | A1 | 1/2009 | Zhamu et al. |
| 2009/0068471 | A1 | 3/2009 | Choi et al. |
| 2009/0075035 | A1 * | 3/2009 | O'Brien et al. ............ 428/195.1 |
| 2009/0110627 | A1 | 4/2009 | Choi et al. |
| 2009/0169467 | A1 | 7/2009 | Zhamu et al. |
| 2010/0036023 | A1 | 2/2010 | Weng et al. |
| 2010/0047154 | A1 | 2/2010 | Lee et al. |
| 2010/0055017 | A1 | 3/2010 | Vanier et al. |
| 2010/0055025 | A1 | 3/2010 | Jang et al. |
| 2010/0072430 | A1 | 3/2010 | Gergely et al. |
| 2010/0096597 | A1 | 4/2010 | Prud'homme et al. |
| 2010/0126660 | A1 | 5/2010 | O'Hara |
| 2010/0247801 | A1 | 9/2010 | Zenasni |
| 2010/0255219 | A1 | 10/2010 | Wenxu et al. |
| 2010/0301212 | A1 | 12/2010 | Dato et al. |
| 2010/0303706 | A1 | 12/2010 | Wallace et al. |
| 2010/0314788 | A1 | 12/2010 | Hung et al. |
| 2010/0323113 | A1 | 12/2010 | Ramappa et al. |
| 2011/0046289 | A1 | 2/2011 | Zhamu et al. |
| 2011/0070426 | A1 | 3/2011 | Vanier et al. |
| 2012/0021160 | A1 | 1/2012 | Kariyada |
| 2013/0084236 | A1 | 4/2013 | Hung et al. |
| 2013/0084237 | A1 | 4/2013 | Vanier et al. |

FOREIGN PATENT DOCUMENTS

| | | |
|---|---|---|
| KR | 20130013689 A | 2/2013 |
| WO | 2009134492 A2 | 11/2009 |
| WO | 2010107769 A2 | 9/2010 |
| WO | 2011012874 A1 | 2/2011 |
| WO | 2011086391 A1 | 7/2011 |
| WO | 2013049498 A1 | 4/2013 |
| WO | 2013-166414 A2 | 11/2013 |
| WO | 2013165677 A1 | 11/2013 |
| WO | 2013192180 A2 | 12/2013 |

OTHER PUBLICATIONS

Fitzer, et al., Recommended Terminology for the Description of Carbon as a Solid, Pure & Appl. Chem. 1995; 67(3): 473-506.*

Bergeron, Emmanuel "Production of Carbon by Pyrolysis of Methane in Thermal Plasma", Master's Thesis in Applied Sciences, University of Sherbrooke, Faculty of Applied Sciences, Department of Chemical Engineering, Quebec, Canada, Oct. 1997.

Cassagneau et al., "Preparation of Layer-by-Layer Self-Assembly of Silver Nanoparticles Capped by Graphite Oxide Nanosheets", J. Phys. Chem. B 1999, 103, 1789-1793.

Chen, Shanshan et al. "Oxidation Resistance of Graphene-Coated Cu and Cu/Ni Alloy", ACS Nano, Jan. 28, 2011, pp. 1321-1327.

Choi, Ki Seok et al. "Fabrication of Free-Standing Multilayered Graphene and Poly(3,4-ethylenedioxythiophene) Composite Films with Enhanced Conductive and Mechanical Properties", Langmuir, 26 (15), 2010, pp. 12902-12908.

Coraux, Johann "Growth of Graphene on Ir(111)", New Journal of Physics 11, 2009, 023006, pp. 1-22.

Dato, Albert et al. "Substrate-Free Gas-Phase Synthesis of Graphene Sheets", Nano Letters, vol. 8, No. 7, 2008, pp. 2012-2016.

Du, X.S. et al. "Facile Synthesis of Highly Conductive Polyaniline/Graphite Nanocomposites" European Polymer Journal 40, 2000, pp. 1489-1493.

Fincke, James R. et al. "Plasma Pyrolysis of Methane to Hydrogen and Carbon Black" Ind. Eng. Chem. Res., 2002, pp. 1425-1435.

Gannon, Richard E. "Acetylene from Hydrocarbons", Kirk-Othnner Encyclopedia of Chemical Technology, 2003, pp. 1-28.

Gomez De Arco, Lewis et al. "Synthesis, Transfer, and Devices of Single- and Few-Layer Graphene by Chemical Vapor Deposition", IEEE Transactions on Nanotechnology, Vo. 8, No. 2, Mar. 2009, pp. 135-138.

Gonzalez-Aguilar, J. et al. "Carbon Nanostructures Production by Gas-Phase Plasma Processes at Atmospheric Pressure", J. Phys. D: Appl. Phys. 40, 2007, pp. 2361-2374.

Holmen, A. et al. "High-Temperature Pyrolysis of Hydrocarbons. 1. Methane to Acetylene", The Norwegian Institute of Technology, University of Trondheim, Ind. Eng. Chem., Process Des. Dev., vol. 15, No. 3, 1976.

Ji, Liwen et al. "Graphene/Si Multilayer Structure Anodes for Advanced Half and Full Lithium-Ion Cells", Nano Energy, 2011.

Khan, M.S. et al. "Survey of Recent Methane Pyrolysis Literature", Industrial and Engineering Chemistry, vol. 62, No. 10, Oct. 1970.

Kim, Juhan et al. "Fabrication of Graphene Flakes Composed of Multi-Layer Graphene Sheets using a Thermal Plasma Jet System", Nanotechnology 21, Jan. 29, 2010.

Kim, Keun Su et al. "Continuous Synthesis of Nanostructured Sheetlike Carbons by Thermal Plasma Decomposition of Methane", IEEE Transactions on Plasma Science, vol. 35, No. 2, Apr. 2007.

Kostic et al., "Thermodynamic Consideration of B-O-C-H System for Boron Carbide (B4C) Powder Synthesis in Thermal Plasma", 1997, Progress in Plasma Processing of Materials, pp. 889-898.

Lavoie, Martin "Synthesis of Carbon Black From Propane Using a Thermal Plasma", Master's Thesis in Applied Sciences, University of Sherbrooke, Faculty of Applied Sciences, Department of Chemical Engineering, Quebec, Canada, Sep. 1997.

Malesevic, Alexander et al. "Synthesis of Few-Layer Graphene Via Microwave Plasma-Enhanced Chemical Vapour Deposition", Nanotechnology 19, 2008, 305604 (6pps).

Martin-Gallego, M. et al. "Epoxy-Graphene UV-Cured Nanocomposites", Polymer 52, 2011, pp. 4664-4669.

(56) References Cited

OTHER PUBLICATIONS

McWilliams, Andrew, "Market Research Report, Graphene: Technologies, Applications, and Markets", BCC Research, Feb. 2011.

Nandamuri, G. et al. "Chemical Vapor Deposition of Graphene Films" Nanotechnology 21, 2010, 145604 (4pp.).

Prasai, Dhiraj et al. "Graphene: Corrosion-Inhibiting Coating" ACS Nano, 6 (2), 2012, pp. 1102-1108.

Pristavita, Ramona et al. "Carbon Blacks Produced by Thermal Pasma: the Influence of the Reactor Geometry on the Product Morphology", Plasma Chem Process, 30, 2010, pp. 267-279.

Pristavita, Ramona et al. "Carbon Nanoparticle Production by Inductively Coupled Thermal Plasmas: Controlling the Thermal History of Particle Nucleation" Plasma Chem Plasma Process, 31, 2011, pp. 851-866.

Pristavita, Ramona et al., "Carbon Nano-Flakes Produced by an Inductively Coupled Thermal Plasma System for Catalyst Applications", Plasma Chem Plasma Process, 31, 2011, pp. 393-403.

Skinner, Gordon B. "Pyrolysis of Methane and the C2 Hydrocarbons", Monsanto Chemical Co., Research and Engineering Division, Dayton 7, Ohio, pp. 59-68.

Su, Fang-Yuan et al. "Could Graphene Construct an Effective Conducting Network in a High-Power Lithium Ion Battery?" Nano Energy, Feb. 25, 2012.

Subrahmanyam, K.S. et al. "Simple Method of Preparing Graphene Flakes by an Arc-Discharge Method", The Journal of Physical Chemistry C, vol. 113, No. 11, 2009, pp. 4257-4259.

Tang et al., "Processible Nanostructured Materials with Electrical Conductivity and Magnetic Susceptibility: Preparation and Properties of Maghemite/Polyaniline Nanocomposite Films", Chem. Mater., 1999, 11, 1581-1589.

Zhong, Ziyi et al. "Catalytic Growth of Carbon Nanoballs With and Without Cobalt Encapsulation", Chemical Physics Letters 330, 2000, pp. 41-47.

* cited by examiner

PRODUCTION OF GRAPHENIC CARBON PARTICLES UTILIZING HYDROCARBON PRECURSOR MATERIALS

CROSS REFERENCE TO RELATED APPLICATIONS

This application is a 371 national stage entry of PCT/US2012/057811 filed Sep. 28, 2012, which is a continuation-in-part of U.S. patent application Ser. No. 13/249,315 filed Sep. 30, 2011, now U.S. Pat. No. 8,486,363 issued Jul. 16, 2013, and is also a continuation-in-part of U.S. patent application Ser. No. 13/309,894 filed Dec. 2, 2011, now U.S. Pat. No. 8,486,364 filed Jul. 16, 2013. U.S. patent application Ser. No. 13/309,894 filed Dec. 2, 2011, now U.S. Pat. No. 8,486,364, issued Jul. 16, 2013 is a continuation-in-part of U.S. patent application Ser. No. 13/249,315 filed Sep. 30, 2011, now U.S. Pat. No. 8,486,363 issued Jul. 16, 2013.

FIELD OF THE INVENTION

The present invention relates to graphenic carbon particles, and more particularly relates to the production of such particles utilizing hydrocarbon precursor materials.

BACKGROUND INFORMATION

Graphene is an allotrope of carbon having a structure that is one atom thick. The planar structure comprises $sp^2$-bonded carbon atoms that are densely packed in a honeycomb crystal lattice. Graphenic materials approach this ideal structure by having on average only a few one-atom-thick planar sheets of $sp^2$-bonded carbon atoms stacked together.

SUMMARY OF THE INVENTION

An aspect of the present invention is to provide a method for making graphenic carbon particles comprising introducing a hydrocarbon precursor material into a thermal zone, heating the hydrocarbon precursor material in the thermal zone to a temperature of at least 1,000° C. to form the graphenic carbon particles from the hydrocarbon precursor material, and collecting the graphenic carbon particles.

Another aspect of the present invention is to provide an apparatus for making graphenic carbon particles comprising a source of hydrocarbon precursor material, a plasma chamber, and at least one feed line for delivering the hydrocarbon precursor material to the plasma chamber.

These and other aspects of the present invention will be more apparent from the following description.

DETAILED DESCRIPTION

Figure 1:
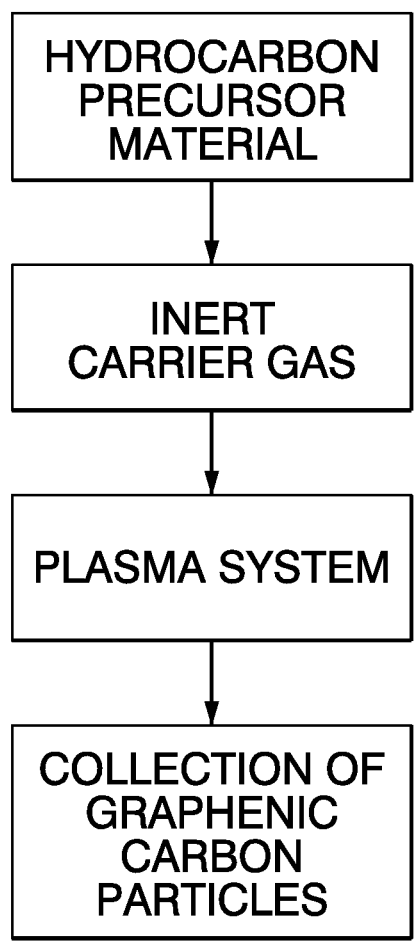
FIG. 1 is a schematic flow diagram illustrating a method of forming graphenic carbon particles from a hydrocarbon precursor material in accordance with an embodiment of the present invention.

Certain embodiments of the present invention are directed to methods and apparatus for making graphenic carbon particles, as well as the graphenic carbon particles produced by such methods and apparatus. As used herein, the term "graphenic carbon particles" means carbon particles having structures comprising one or more layers of one-atom-thick planar sheets of $sp^2$-bonded carbon atoms that are densely packed in a honeycomb crystal lattice. The average number of stacked layers may be less than 100, for example, less than 50. In certain embodiments, the average number of stacked layers is 30 or less. The graphenic carbon particles may be substantially flat, however, at least a portion of the planar sheets may be substantially curved, curled or buckled. The particles typically do not have a spheroidal or equiaxed morphology.

In certain embodiments, the graphenic carbon particles made in accordance with the present invention have a thickness, measured in a direction perpendicular to the carbon atom layers, of no more than 10 nanometers, such as no more than 5 nanometers, or, in certain embodiments, no more than 3 or 1 nanometers. In certain embodiments, the graphenic carbon particles may be from 1 atom layer to 10, 20 or 30 atom layers thick, or more.

In certain embodiments, the graphenic carbon particles have a width and length, measured in a direction parallel to the carbon atoms layers, of at least 50 nanometers, such as more than 100 nanometers, in some cases more than 100 nanometers up to 500 nanometers, or more than 100 nanometers up to 200 nanometers. The graphenic carbon particles may be provided in the form of ultrathin flakes, platelets or sheets having relatively high aspect ratios (aspect ratio being defined as the ratio of the longest dimension of a particle to the shortest dimension of the particle) of greater than 3:1, such as greater than 10:1.

In certain embodiments, the graphenic carbon particles have relatively low oxygen content. For example, the graphenic carbon particles may, even when having a thickness of no more than 5 or no more than 2 nanometers, have an oxygen content of no more than 2 atomic weight percent, such as no more than 1.5 or 1 atomic weight percent, or no more than 0.6 atomic weight, such as about 0.5 atomic weight percent. The oxygen content of the graphenic carbon particles can be determined using X-ray Photoelectron Spectroscopy, such as is described in D. R. Dreyer et al., Chem. Soc. Rev. 39, 228-240 (2010).

In certain embodiments, the graphenic carbon particles have a B.E.T. specific surface area of at least 50 square meters per gram, such as 70 to 1000 square meters per gram, or, in some cases, 200 to 1000 square meters per grams or 200 to 400 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

In certain embodiments, the graphenic carbon particles have a Raman spectroscopy 2D/G peak ratio of at least 1.1, for example, at least 1.2 or 1.3. As used herein, the term "2D/G peak ratio" refers to the ratio of the intensity of the 2D peak at 2692 $cm^{-1}$ to the intensity of the G peak at 1,580 $cm^{-1}$.

In certain embodiments, the graphenic carbon particles have a relatively low bulk density. For example, the graphenic carbon particles are characterized by having a bulk density (tap density) of less than 0.2 $g/cm^3$, such as no more than 0.1 $g/cm^3$. For the purposes of the present invention, the bulk density of the graphenic carbon particles is determined by placing 0.4 grams of the graphenic carbon particles in a glass measuring cylinder having a readable scale. The cylinder is raised approximately one-inch and tapped 100 times, by striking the base of the cylinder onto a hard surface, to allow the graphenic carbon particles to settle within the cylinder. The volume of the particles is then measured, and the bulk density is calculated by dividing 0.4 grams by the measured volume, wherein the bulk density is expressed in terms of $g/cm^3$.

In certain embodiments, the graphenic carbon particles have a compressed density and a percent densification that is less than the compressed density and percent densification of graphite powder and certain types of substantially flat graphenic carbon particles. Lower compressed density and lower percent densification are each currently believed to contribute to better dispersion and/or rheological properties than graphenic carbon particles exhibiting higher compressed density and higher percent densification. In certain embodiments, the compressed density of the graphenic carbon particles is 0.9 or less, such as less than 0.8, less than 0.7, such as from 0.6 to 0.7. In certain embodiments, the percent densification of the graphenic carbon particles is less than 40%, such as less than 30%, such as from 25 to 30%.

For purposes of the present invention, the compressed density of graphenic carbon particles is calculated from a measured thickness of a given mass of the particles after compression. Specifically, the measured thickness is determined by subjecting 0.1 grams of the graphenic carbon particles to cold press under 15,000 pound of force in a 1.3 centimeter die for 45 minutes, wherein the contact pressure is 500 MPa. The compressed density of the graphenic carbon particles is then calculated from this measured thickness according to the following equation:

$$\text{Compressed Density (g/cm}^3\text{)} = \frac{0.1 \text{ grams}}{\prod * (1.3 \text{ cm}/2)^2 * (\text{measured thickness in cm})}$$

The percent densification of the graphenic carbon particles is then determined as the ratio of the calculated compressed density of the graphenic carbon particles, as determined above, to 2.2 $g/cm^3$, which is the density of graphite.

In certain embodiments, the graphenic carbon particles have a measured bulk liquid conductivity of at least 100 microSiemens, such as at least 120 microSiemens, such as at least 140 microSiemens immediately after mixing and at later points in time, such as at 10 minutes, or 20 minutes, or 30 minutes, or 40 minutes. For the purposes of the present invention, the bulk liquid conductivity of the graphenic carbon particles is determined as follows. First, a sample comprising a 0.5% solution of graphenic carbon particles in butyl cellosolve is sonicated for 30 minutes with a bath sonicator. Immediately following sonication, the sample is placed in a standard calibrated electrolytic conductivity cell (K=1). A Fisher Scientific AB 30 conductivity meter is introduced to the sample to measure the conductivity of the sample. The conductivity is plotted over the course of about 40 minutes.

In accordance with certain embodiments, percolation, defined as long range interconnectivity, occurs between the conductive graphenic carbon particles. Such percolation may reduce the resistivity of the materials in which the graphenic particles are dispersed. The conductive graphenic particles may occupy a minimum volume within a composite matrix such that the particles form a continuous, or nearly continuous, network. In such a case, the aspect ratios of the graphenic carbon particles may affect the minimum volume required for percolation. Furthermore, the surface energy of the graphenic carbon particles may be the same or similar to the surface energy of the matrix material. Otherwise, the particles may tend to flocculate or demix as they are processed.

In accordance with embodiments of the invention, the graphenic carbon particles are produced from hydrocarbon precursor materials that are heated to high temperatures in a thermal zone. The hydrocarbon precursor materials may be any organic molecule that contains carbon and hydrogen, and has a molecular structure which, when heated to the elevated temperatures under inert conditions as described herein, yields a two-carbon-fragment species, i.e., a species having two carbon atoms bonded together. The two-carbon-fragment species may comprise carbon alone or, in certain embodiments, may include at least one hydrogen atom. While not intending to be bound by any particular theory, at the high thermal zone temperatures, decomposition occurs and the hydrogen atoms may be entirely or partially lost. The remaining two-carbon-fragment species form graphenic carbon particles with relatively high product yields in accordance with embodiments of the invention.

In certain embodiments, small molecule hydrocarbon precursor materials that produce two-carbon-fragment species during the thermal treatment process are used to produce high quality graphenic carbon particles. Examples of hydrocarbon precursor materials include n-propanol, ethane, ethylene, acetylene, vinyl chloride, 1,2-dichloroethane, allyl alcohol, propionaldehyde, vinyl bromide and the like. Other feed materials that yield two-carbon-fragment species on thermolysis may also be used. The structures of some hydrocarbon precursors capable of forming two-carbon-fragment species are shown below.

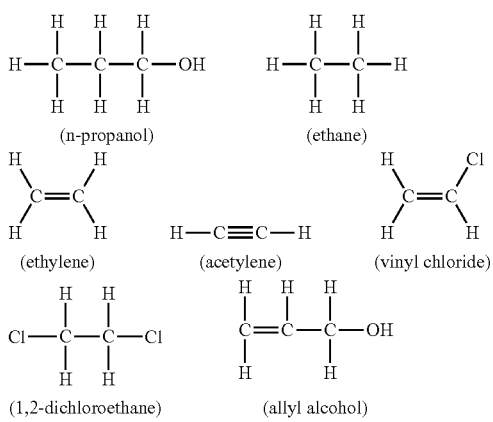

(n-propanol)  (ethane)

(ethylene)  (acetylene)  (vinyl chloride)

(1,2-dichloroethane)  (allyl alcohol)

In accordance with embodiments of the invention, the graphenic carbon particles are produced from methane precursor materials that are heated to high temperatures in a thermal zone. As used herein, the term "methane precursor material" means a material comprising significant amounts of methane, typically at least 50 weight percent methane. For example, the methane precursor material may comprise gaseous or liquid methane of at least 95 or 99 percent purity or higher. In certain embodiments, the methane precursor may have a purity of at least 99.9 or 99.99 percent. In an embodiment, the methane precursor may be provided in the form of natural gas.

While not intending to be bound by any particular theory, at the high thermal zone temperatures, decomposition or pyrolysis of methane may involve the formulation of two-carbon-fragment species:

$CH_4 \rightarrow .CH_3 + H.$ $CH_4 + H. \rightarrow .CH_3 + H_2$ $.CH_3 + .CH_3 \rightarrow C_2H_6$ $C_2H_6 \rightarrow C_2H_4 + H_2$ $C_2H_4 \rightarrow C_2H_2 + H_2$ In certain embodiments, low concentrations of additional feed materials or dopants comprising atoms of B, N, O, F, Al, Si, P, S and/or Li may be introduced in the thermal zone to produce doped graphene containing low levels of the doping atom or atoms. The dopant feed materials typically comprise less than 15 weight percent relative to the concentration of methane. Functionalization or doping of the graphene may also be effected by introducing these dopants or reactive organic molecules at a cooler zone of the process such as at or near the quench location. For example, a low concentration of oxygen introduced at the quench stage could result in functionalization of the graphene with hydroxyl, epoxy and/or carboxyl groups.

FIG. 1 is a flow diagram depicting certain embodiments of the methods of the present invention. At least one hydrocarbon precursor material selected in accordance with the present invention is provided as a feed material. In accordance with certain methods of the present invention, the hydrocarbon precursor feed materials are contacted with an inert carrier gas. Suitable inert carrier gases include, but are not limited to, argon, hydrogen, helium, nitrogen and combinations thereof.

Next, in accordance with certain embodiments of the present invention, the hydrogen precursor materials are heated in a thermal zone, for example, by a plasma system. In certain embodiments, the hydrogen precursor materials are heated to a temperature ranging from 1,000° C. to 20,000° C., such as 1,200° C. to 10,000° C. For example, the temperature of the thermal zone may range from 1,500 to 8,000° C., such as from 2,000 to 5,000° C., or may range from greater than 3,500° C. to 10,000° C. Although the thermal zone may be generated by a plasma system in accordance with embodiments of the present invention, it is to be understood that any other suitable heating system may be used to create the thermal zone, such as various types of furnaces including electrically heated tube furnaces and the like.

In certain methods of the present invention, the gaseous stream is contacted with one or more quench streams that are injected into the plasma chamber through at least one quench stream injection port. For example, the quench streams are injected at flow rates and injection angles that result in impingement of the quench streams with each other within the gaseous stream. The quench stream may cool the gaseous stream to facilitate the formation or control the particle size or morphology of the graphenic carbon particles. Materials suitable for use in the quench streams include, but are not limited to, inert gases such as argon, hydrogen, helium, nitrogen and the like.

In certain embodiments, the particular flow rates and injection angles of the various quench streams may vary, and may impinge with each other within the gaseous stream to result in the rapid cooling of the gaseous stream. For example, the quench streams may primarily cool the gaseous stream through dilution, rather than adiabatic expansion, thereby causing a rapid quenching of the gaseous stream, before, during and/or after the formation of the graphenic carbon particles. Such quenching may occur in certain embodiments prior to passing the particles into and through a converging member, such as a converging-diverging nozzle, as described below.

In certain embodiments of the invention, after contacting the gaseous product stream with the quench streams, the ultrafine particles may be passed through a converging member, wherein the plasma system is designed to minimize the fouling thereof. In certain embodiments, the converging member comprises a converging-diverging (De Laval) nozzle. In these embodiments, while the converging-diverging nozzle may act to cool the product stream to some degree, the quench streams perform much of the cooling so that a substantial amount of the graphenic carbon particles are formed upstream of the nozzle. In these embodiments, the converging-diverging nozzle may primarily act as a choke position that permits operation of the reactor at higher pressures, thereby increasing the residence time of the materials therein.

As is seen in FIG. 1, in certain embodiments of the present invention, after the graphenic carbon particles exit the plasma system, they are collected. Any suitable means may be used to separate the graphenic carbon particles from the gas flow, such as, for example, a bag filter, cyclone separator or deposition on a substrate.

In accordance with embodiments of the invention, relatively high product yields are achieved. For example, the weight of the collected graphenic particles may be at least 10 or 12 percent of the weight of the hydrocarbon precursor material that is fed to the plasma system.

Figure 2:
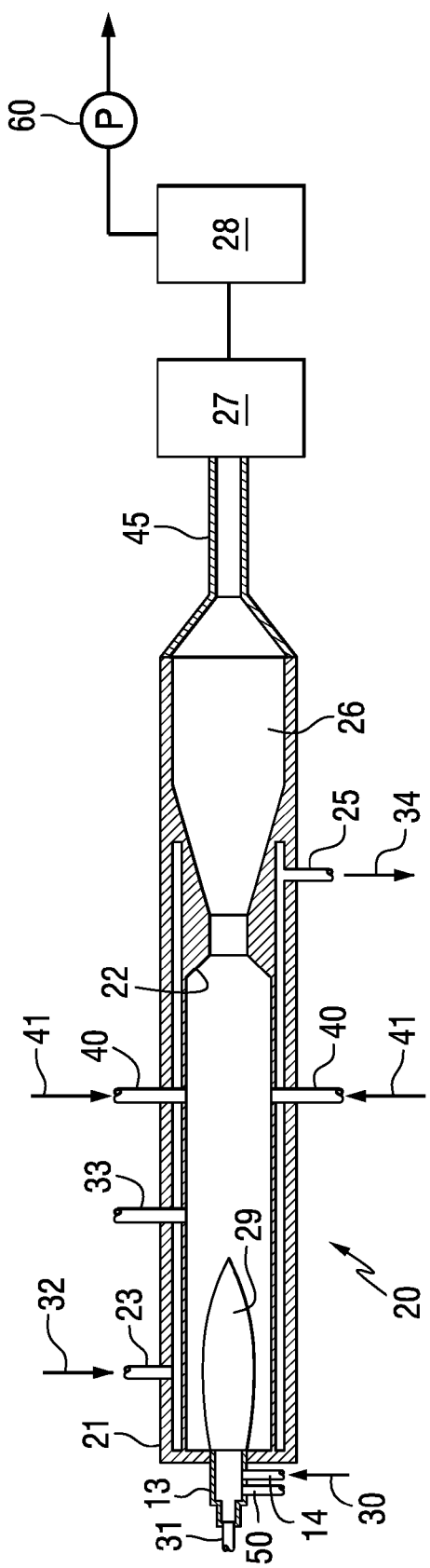
FIG. 2 is a partially schematic longitudinal section view of a plasma system for producing graphenic carbon particles in accordance with an embodiment of the present invention.

FIG. 2 is a partially schematic sectional diagram of an apparatus for producing graphenic carbon particles in accordance with certain embodiments of the present invention. A plasma chamber 20 is provided that includes a feed inlet 50 which, in the embodiment shown in FIG. 2, is used to introduce the hydrocarbon precursor material into the plasma chamber 20. In another embodiment, the feed inlet 50 may be replaced with separate inlets (not shown) for the feed material. Also provided is at least one carrier gas feed inlet 14, through which a carrier gas flows in the direction of arrow 30 into the plasma chamber 20. The carrier gas and hydrocarbon precursor material form a gas-stream which flows towards plasma 29. A cooling inlet 23 and outlet 25 may be present for a double-walled plasma chamber 20. In these embodiments, coolant flow is indicated by arrows 32 and 34.

In the embodiment shown in FIG. 2, a plasma torch 21 is provided. The torch 21 may thermally decompose or vaporize the feed materials within or near the plasma 29 as the stream is delivered through the inlet of the plasma chamber 20. As is seen in FIG. 2, the feed materials are, in certain embodiments, injected downstream of the location where the arc attaches to the annular anode 13 of the plasma generator or torch.

A plasma is a high temperature luminous gas which is at least partially (1 to 100%) ionized. A plasma is made up of gas atoms, gas ions, and electrons. A thermal plasma can be created by passing a gas through an electric arc. The electric arc will rapidly heat the gas by resistive and radiative heating to very high temperatures within microseconds of passing through the arc. The plasma is often luminous at temperatures above 9,000 K.

A plasma can be produced with any of a variety of gases. This can give excellent control over the occurrence of any chemical reactions taking place in the plasma, as the gas may be inert, such as argon, helium, nitrogen, hydrogen or the like. Such inert gases may be used to produce graphenic carbon particles in accordance with the present invention. In FIG. 2, the plasma gas feed inlet is depicted at 31.

As the gaseous product stream exits the plasma 29 it proceeds towards the outlet of the plasma chamber 20. An additional stream can optionally be injected into the reaction chamber prior to the injection of the quench streams. A supply inlet for the additional stream is shown in FIG. 2 at 33.

As is seen in FIG. 2, in certain embodiments of the present invention, the gaseous stream is contacted with a plurality of quench streams which enter the plasma chamber 20 in the direction of arrows 41 through a plurality of quench stream injection ports 40 located along the circumference of the plasma chamber 20. As previously indicated, the particular flow rate and injection angle of the quench streams may result in impingement of the quench streams 41 with each other within the gaseous stream, in some cases at or near the center of the gaseous stream, to result in the rapid cooling of the gaseous stream to control the particle size and/or morphology of the graphenic carbon particles. This may result in a quenching of the gaseous stream through dilution.

In certain methods of the present invention, contacting the gaseous stream with the quench streams may result in the formation and/or control of the size or morphology of the graphenic carbon particles, which are then passed into and through a converging member. As used herein, the term "converging member" refers to a device that restricts passage of a flow therethrough, thereby controlling the residence time of the flow in the plasma chamber due to pressure differential upstream and downstream of the converging member.

In certain embodiments, the converging member comprises a converging-diverging (De Laval) nozzle, such as that depicted in FIG. 2, which is positioned within the outlet of the plasma chamber 20. The converging or upstream section of the nozzle, i.e., the converging member, restricts gas passage and controls the residence time of the materials within the plasma chamber 20. It is believed that the contraction that occurs in the cross sectional size of the stream as it passes through the converging portion of nozzle 22 changes the motion of at least some of the flow from random directions, including rotational and vibrational motions, to a straight line motion parallel to the plasma chamber axis. In certain embodiments, the dimensions of the plasma chamber 20 and the material flow are selected to achieve sonic velocity within the restricted nozzle throat.

As the confined stream of flow enters the diverging or downstream portion of the nozzle 22, it is subjected to an ultra fast decrease in pressure as a result of a gradual increase in volume along the conical walls of the nozzle exit. By proper selection of nozzle dimensions, the plasma chamber 20 can be operated at atmospheric pressure, or slightly less than atmospheric pressure, or, in some cases, at a pressurized condition, to achieve the desired residence time, while the chamber 26 downstream of the nozzle 22 may be maintained at a vacuum pressure by operation of a vacuum producing device, such as a vacuum pump 60. Following passage through nozzle 22, the graphenic carbon particles may then enter a cool down chamber 26.

Although the nozzle shown in FIG. 2 includes a converging portion and a downstream diverging portion, other nozzle configurations may be used. For example, the downstream diverging portion may be replaced with a straight portion. Quench streams may be introduced at or near the transition from the converging portion to the straight portion.

As is apparent from FIG. 2, in certain embodiments of the present invention, the graphenic carbon particles may flow from cool down chamber 26 to a collection station 27 via a cooling section 45, which may comprise, for example, a jacketed cooling tube. In certain embodiments, the collection station 27 comprises a bag filter or other collection means. A downstream scrubber 28 may be used if desired to condense and collect material within the flow prior to the flow entering vacuum pump 60.

In certain embodiments, the residence times for materials within the plasma chamber 20 are on the order of milliseconds. The hydrocarbon precursor materials may be injected under pressure (such as from 1 to 300 psi) through a small orifice to achieve sufficient velocity to penetrate and mix with the plasma. In addition, in many cases the injected stream is injected normal (90° angle) to the flow of the plasma gases. In some cases, positive or negative deviations from the 90° angle by as much as 30° may be desired.

The high temperature of the plasma may rapidly decompose and/or vaporize the feed materials. There can be a substantial difference in temperature gradients and gaseous flow patterns along the length of the plasma chamber 20. It is believed that, at the plasma arc inlet, flow is turbulent and there may be a high temperature gradient, e.g., from temperatures of up to about 20,000 K at the axis of the chamber to about 375 K at the chamber walls. At the nozzle throat, it is believed, the flow is laminar and there is a very low temperature gradient across its restricted open area.

The plasma chamber is often constructed of water cooled stainless steel, nickel, titanium, copper, aluminum, or other suitable materials. The plasma chamber can also be constructed of ceramic materials to withstand a vigorous chemical and thermal environment.

The plasma chamber walls may be internally heated by a combination of radiation, convection and conduction. In certain embodiments, cooling of the plasma chamber walls prevents unwanted melting and/or corrosion at their surfaces. The system used to control such cooling should maintain the walls at as high a temperature as can be permitted by the selected wall material, which often is inert to the materials within the plasma chamber at the expected wall temperatures.

This is true also with regard to the nozzle walls, which may be subjected to heat by convection and conduction.

The length of the plasma chamber is often determined experimentally by first using an elongated tube within which the user can locate the target threshold temperature. The plasma chamber can then be designed long enough so that the materials have sufficient residence time at the high temperature to reach an equilibrium state and complete the formation of the desired end products.

The inside diameter of the plasma chamber 20 may be determined by the fluid properties of the plasma and moving gaseous stream. It should be sufficiently great to permit necessary gaseous flow, but not so large that recirculating eddys or stagnant zones are formed along the walls of the chamber. Such detrimental flow patterns can cool the gases prematurely and precipitate unwanted products. In many cases, the inside diameter of the plasma chamber 20 is more than 100% of the plasma diameter at the inlet end of the plasma chamber.

In certain embodiments, the converging section of the nozzle has a high aspect ratio change in diameter that maintains smooth transitions to a first steep angle (such as >45°) and then to lesser angles (such as <45° degree.) leading into the nozzle throat. The purpose of the nozzle throat is often to compress the gases and achieve sonic velocities in the flow. The velocities achieved in the nozzle throat and in the downstream diverging section of the nozzle are controlled by the pressure differential between the plasma chamber and the section downstream of the diverging section of the nozzle. Negative pressure can be applied downstream or positive pressure applied upstream for this purpose. A converging-diverging nozzle of the type suitable for use in the present invention is described in U.S. Pat. No. RE37,853 at col. 9, line 65 to col. 11, line 32, the cited portion of which being incorporated by reference herein.

The following examples are intended to illustrate certain embodiments of the present invention, and are not intended to limit the scope of the invention.

EXAMPLE 1

Figure 3:
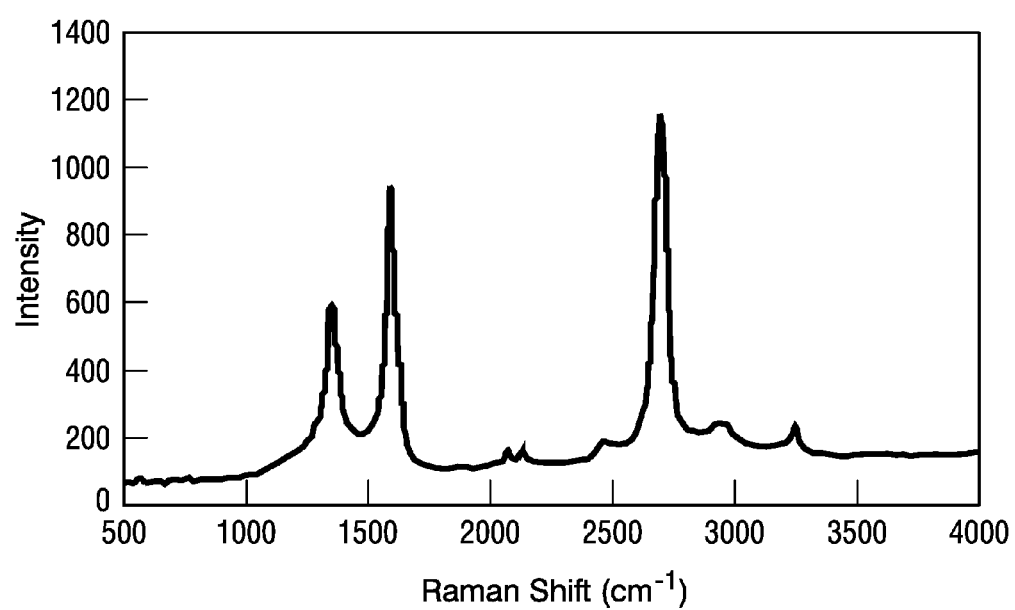
FIG. 3 is a plot of Raman shift versus reflectance for a sample of graphenic carbon particles produced from an n-propanol hydrocarbon precursor material in accordance with an embodiment of the present invention.
Figure 4:
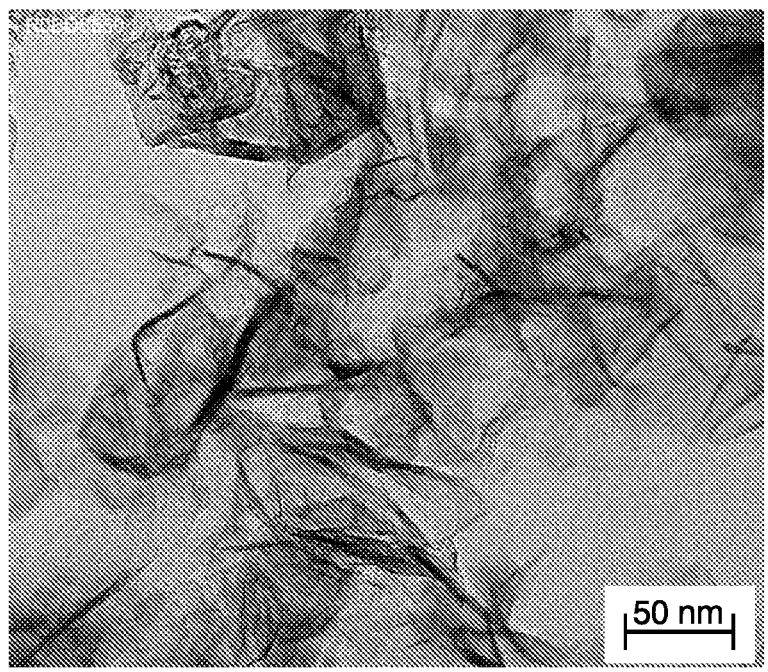
FIGS. 4 and 5 are TEM micrographs of the graphenic carbon particles corresponding to FIG. 3.
Figure 5:
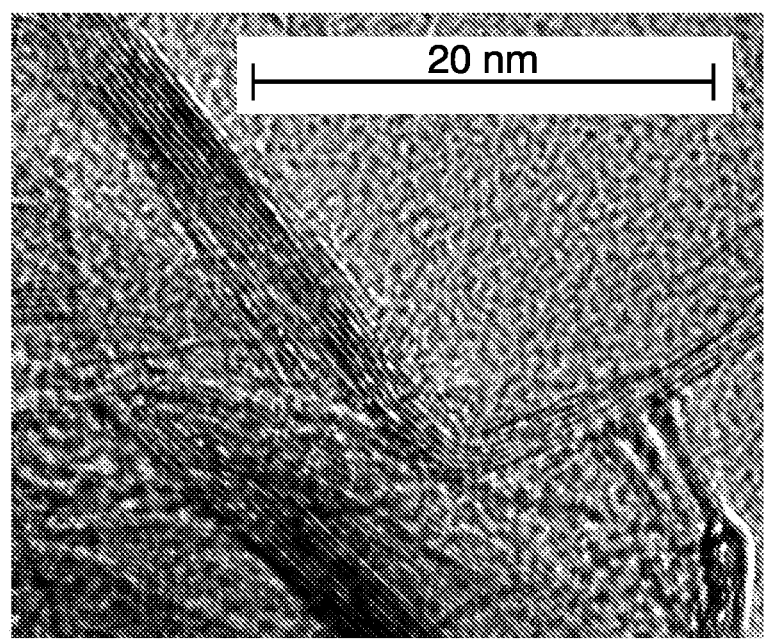

Graphenic carbon particles were produced using a DC thermal plasma reactor system similar to that shown in FIG. 2. The main reactor system included a DC plasma torch (Model SG-100 Plasma Spray Gun commercially available from Praxair Technology, Inc., Danbury, Conn.) operated with 60 standard liters per minute of argon carrier gas and 26 kilowatts of power delivered to the torch. N-propanol precursor (commercially available from Alfa Aesar, Ward Hill, Mass.) was fed to the reactor at a rate of 12 grams per minute through a gas assisted liquid nebulizer located about 0.5 inch down stream of the plasma torch outlet. At the nebulizer, 15 standard liters per minute of argon were delivered to assist in atomization of the liquid precursors. Following a 14 inch long reactor section, a plurality of quench stream injection ports were provided that included 6⅛ inch diameter nozzles located 60° apart radially. Quench argon gas was injected through the quench stream injection ports at a rate of 185 standard liters per minute. The produced particles were collected in a bag filter. The solid material collected was 13 weight percent of the feed material, corresponding to a 13 percent yield. Analysis of particle morphology using Raman analysis and high resolution transmission electron microscopy (TEM) indicates the formation of a graphenic layer structure with average thickness of less than 3.6 nm. The Raman plot shown in FIG. 3 demonstrates that graphenic carbon particles were formed by virtue of the sharp and tall peak at 2692 on the plot versus shorter peaks at 1348 and 1580. The TEM image of FIG. 4 shows the thin plate-like graphenic particles, while the higher magnification TEM image of FIG. 5 shows an edge view of one of the platelets having several stacked atomic layers.

EXAMPLE 2

Example 1 was repeated, except ethanol having the molecular structure shown below was used as the feed material (commercially available from Alfa Aesar, Ward Hill, Mass.).

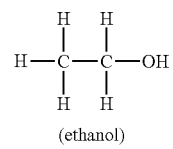

(ethanol)

Figure 6:
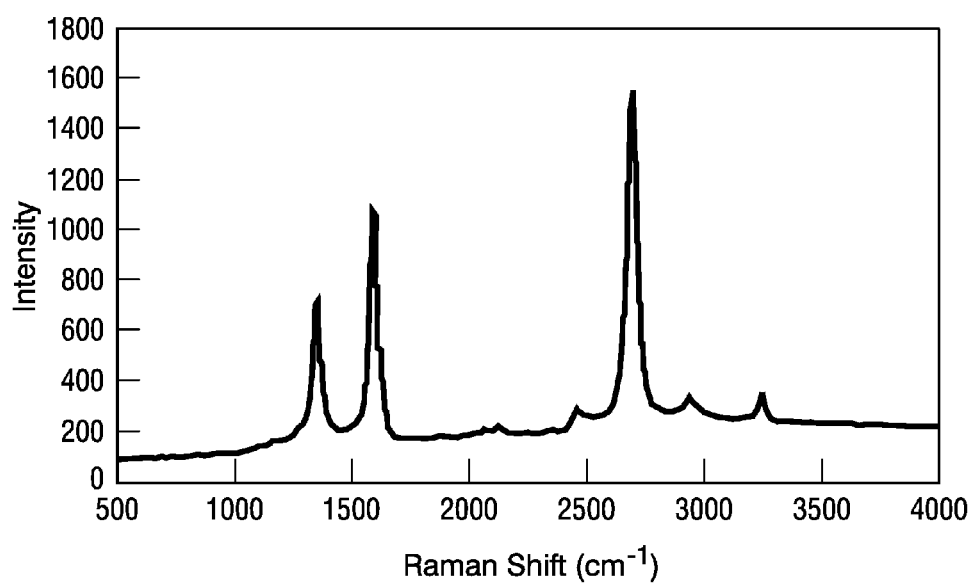
FIG. 6 is a plot of Raman shift versus reflectance for a sample of graphenic carbon particles produced from an ethanol precursor material.
Figure 7:
FIGS. 7 and 8 are TEM micrographs of the graphenic carbon particles corresponding to FIG. 6.
Figure 8:
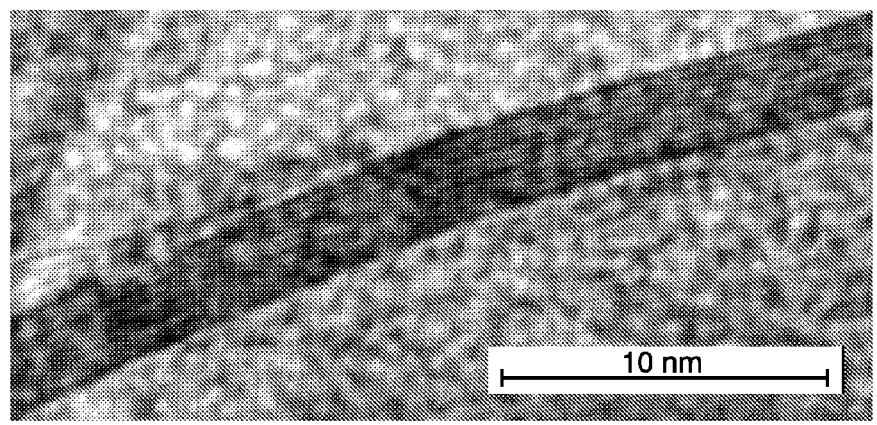

The solid material collected was only 1 weight percent of the feed material, corresponding to a 1 percent yield. Raman and TEM analysis of the particle morphology as illustrated in FIGS. 6-8 indicates the formation of a graphenic layer structure.

EXAMPLE 3

Example 1 was repeated, except iso-propanol having the molecular structure shown below was used as the feed material (commercially available from Alfa Aesar, Ward Hill, Mass.).

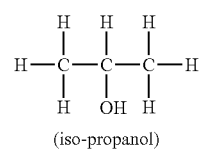

(iso-propanol)

Figure 9:
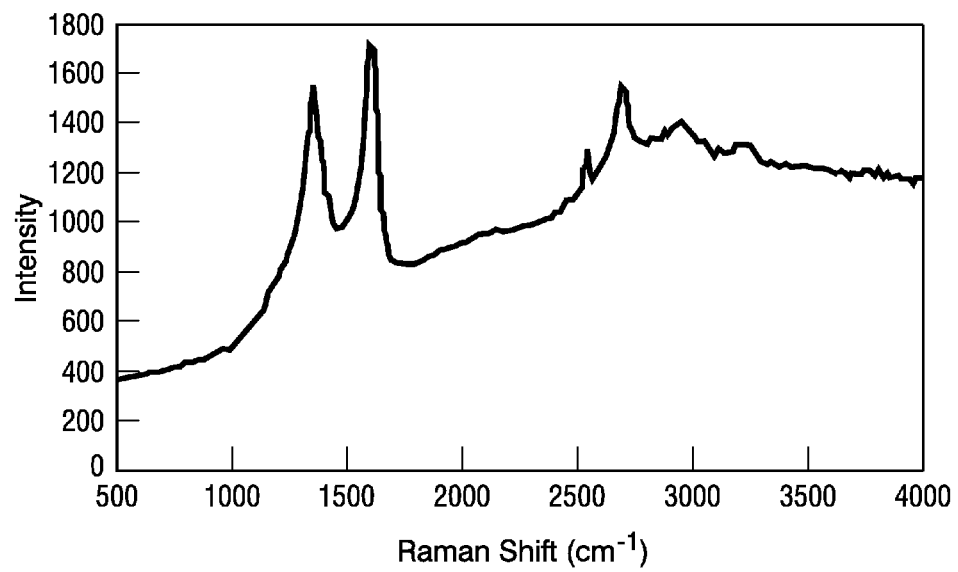
FIG. 9 is a plot of Raman shift versus reflectance for a sample of carbon particles produced from an iso-propanol precursor material.
Figure 10:
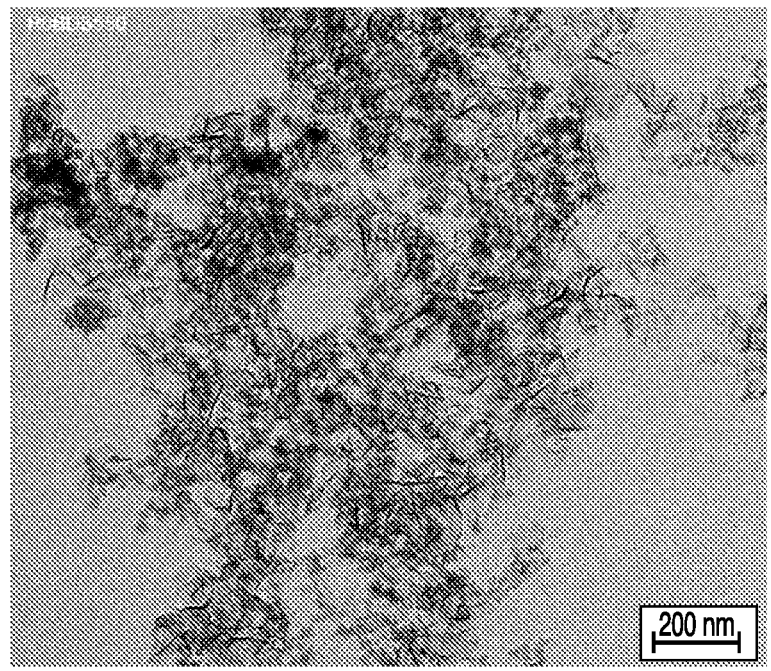
FIGS. 10 and 11 are TEM micrographs of the carbon particles corresponding to FIG. 9.
Figure 11:
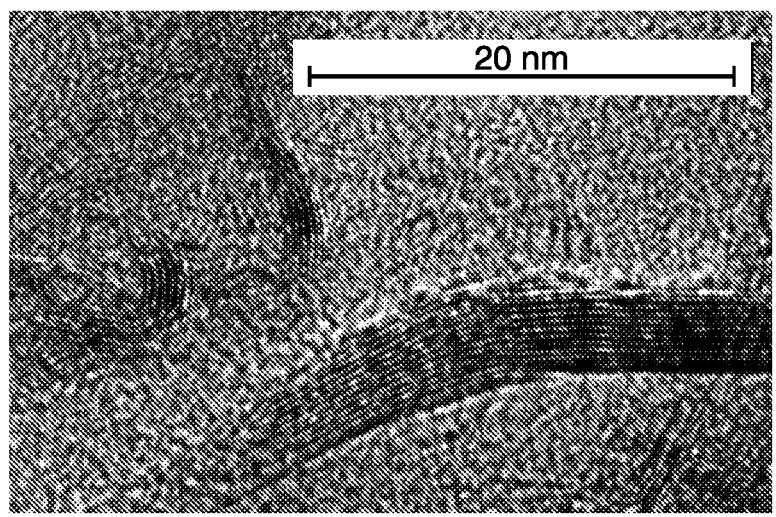

The solid material collected was 5 weight percent of the feed material, corresponding to a 5 percent yield. Raman and TEM analysis of particle morphology as illustrated in FIGS. 9-11 indicates the particles do not have a graphenic layer structure. Specifically, the Raman plot includes a non-distinct and spread out peak in the 2692 region, and significant peaks in the 1348 and 1587 regions. As shown in the TEM images of FIGS. 10 and 11, the particles tend to be non-plate-like.

EXAMPLE 4

Example 1 was repeated, except n-butanol having the molecular structure shown below was used as the feed material (commercially available from Alfa Aesar, Ward Hill, Mass.).

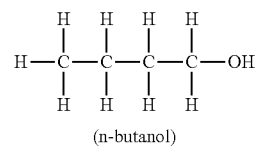

(n-butanol)

Figure 12:
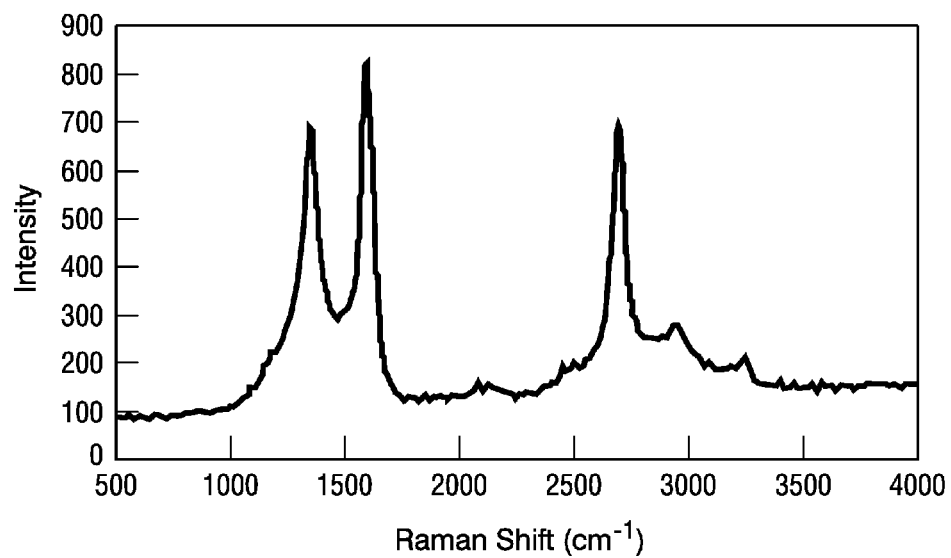
FIG. 12 is a plot of Raman shift versus reflectance for a sample of carbon particles produced from an n-butanol precursor material.
Figure 13:
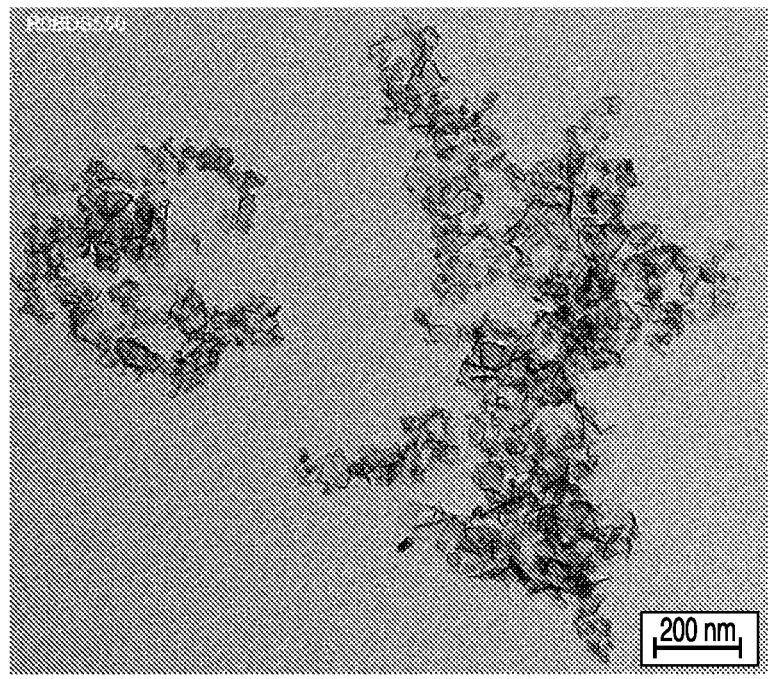
FIGS. 13 and 14 are TEM micrographs of the carbon particles corresponding to FIG. 12.
Figure 14:
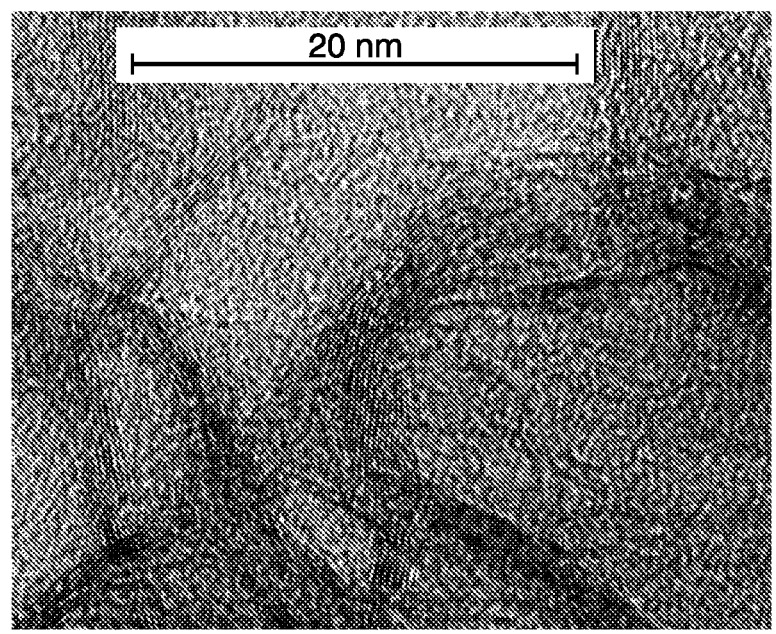

The solid material collected was 9 weight percent of the feed material, corresponding to a 9 percent yield. Raman and TEM analysis of particle morphology as shown in FIGS. 12-14 indicates that a predominantly graphenic structure is not formed, i.e., the particles comprise a mixture of crystalline spheroidal structures with graphenic layer structures.

EXAMPLE 5

Figure 15:
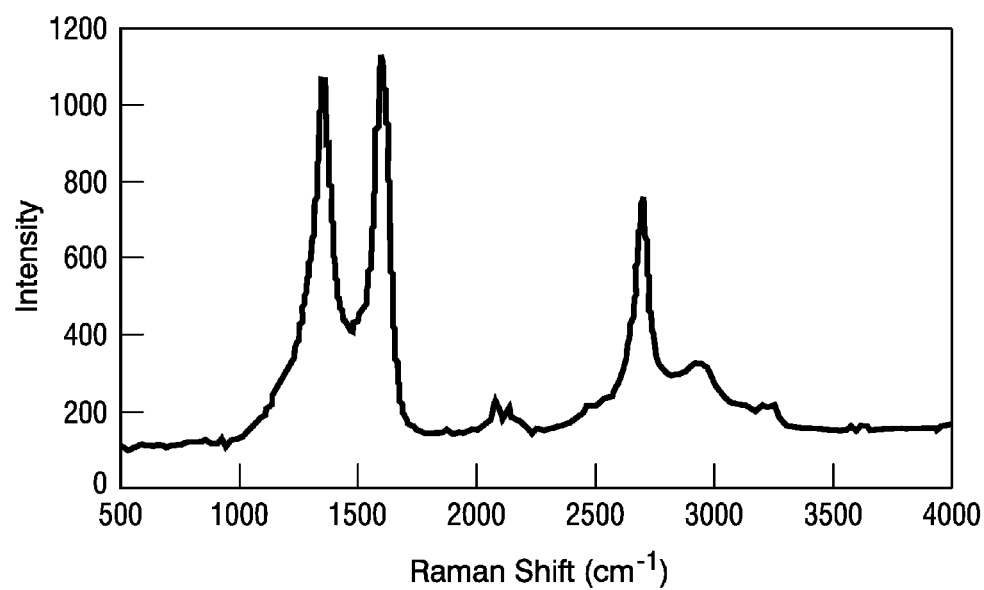
FIG. 15 is a plot of Raman shift versus reflectance for a sample of carbon particles produced from an n-pentanol precursor material.
Figure 16:
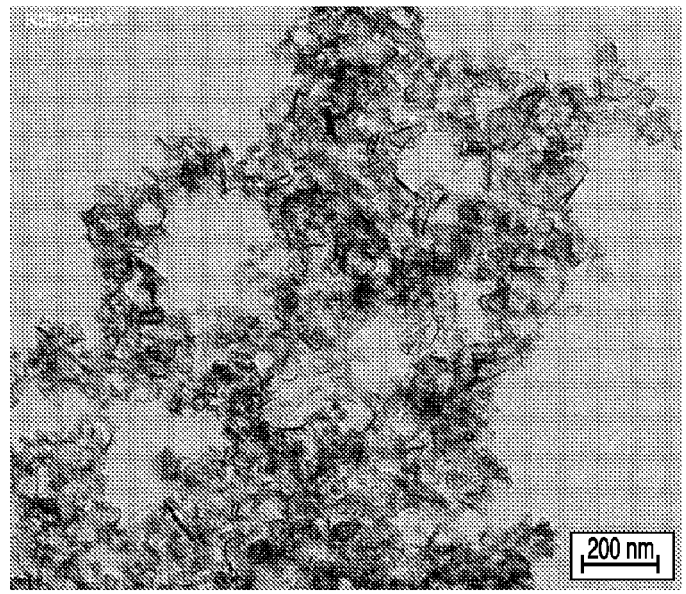
FIGS. 16 and 17 are TEM micrographs of the carbon particles corresponding to FIG. 15.
Figure 17:
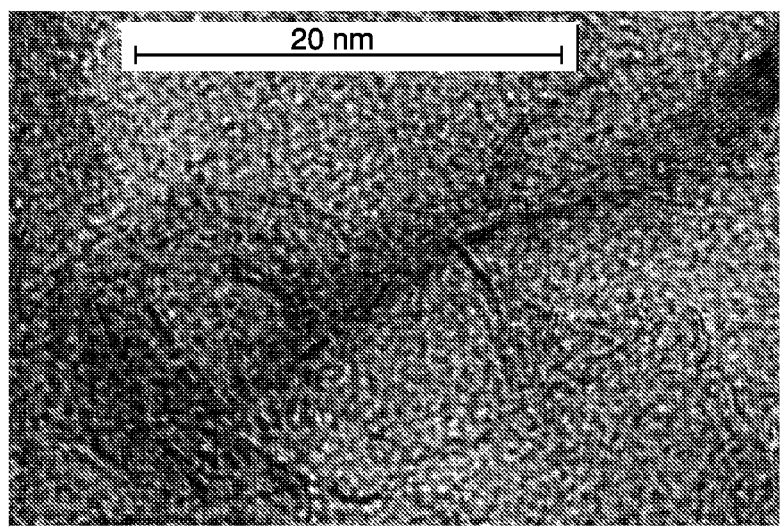

Example 1 was repeated, except n-pentanol was used as the feed material (commercially available from Alfa Aesar, Ward Hill, Mass.). The solid material collected was 12 weight percent of the feed material, corresponding to a 12 percent yield. Raman and TEM analysis of particle morphology as shown in FIGS. 15-17 indicates that a predominantly graphenic structure is not formed, i.e., the particles comprise a mixture of crystalline spheroidal structures with graphenic layer structures.

EXAMPLE 6

Example 1 was repeated, except diethyl ketone was used as the feed material (commercially available from Alfa Aesar, Ward Hill, Mass.). The solid material collected was 13 weight percent of the feed material, corresponding to a 13 percent yield. Raman and TEM analysis of particle morphology indicates that a predominantly graphenic structure is not formed, i.e., the particles comprise a mixture of crystalline spheroidal structures with graphenic layer structures.

EXAMPLE 7

Example 1 was repeated, except propargyl alcohol was used as the feed material (commercially available from Alfa Aesar, Ward Hill, Mass.). The solid material collected was 12 weight percent of the feed material, corresponding to a 12 percent yield. Raman and TEM analysis of particle morphology indicates the particles do not have a graphenic layer structure.

EXAMPLE 8

Figure 18:
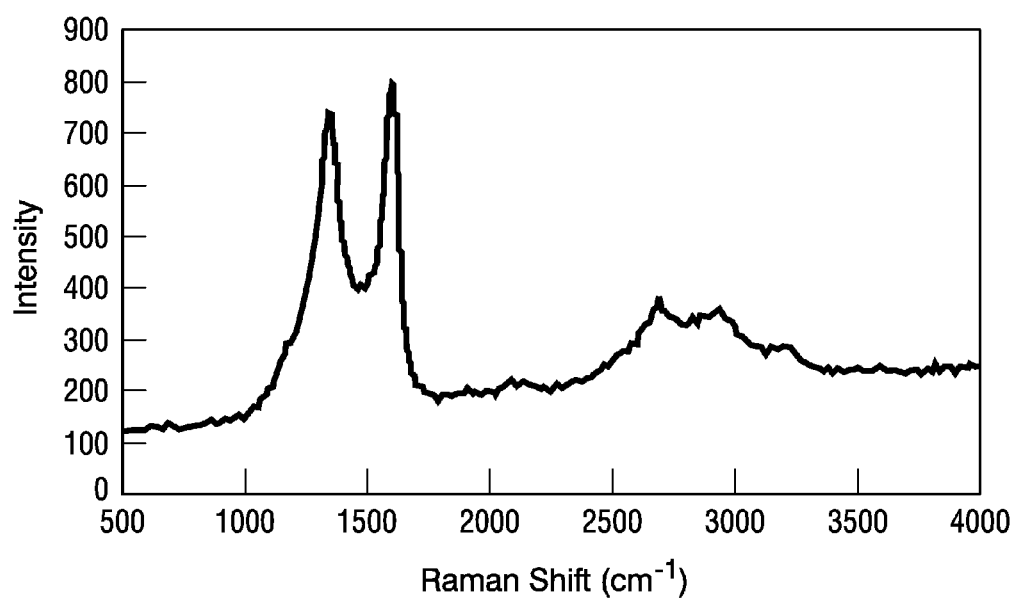
FIG. 18 is a plot of Raman shift versus reflectance for a sample of carbon particles produced from an n-hexane precursor material.
Figure 19:
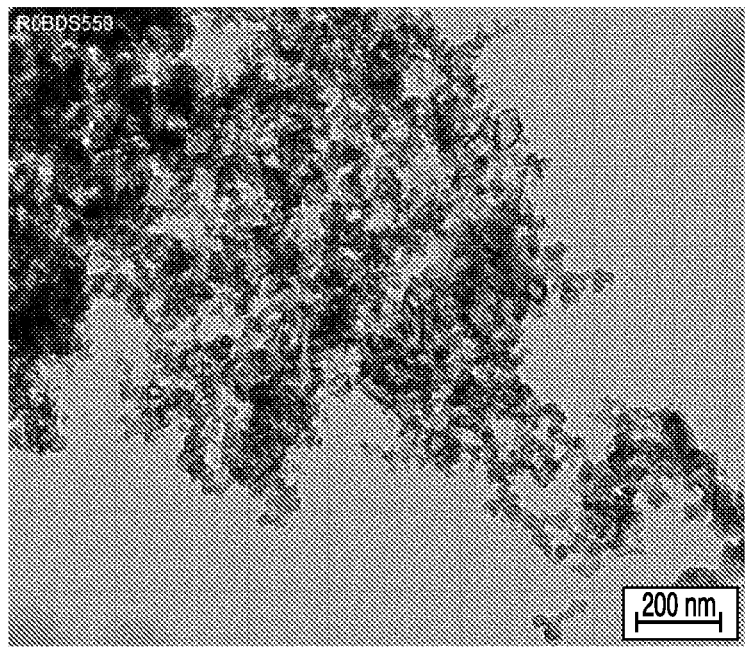
FIGS. 19 and 20 are TEM micrographs of the carbon particles corresponding to FIG. 18.
Figure 20:
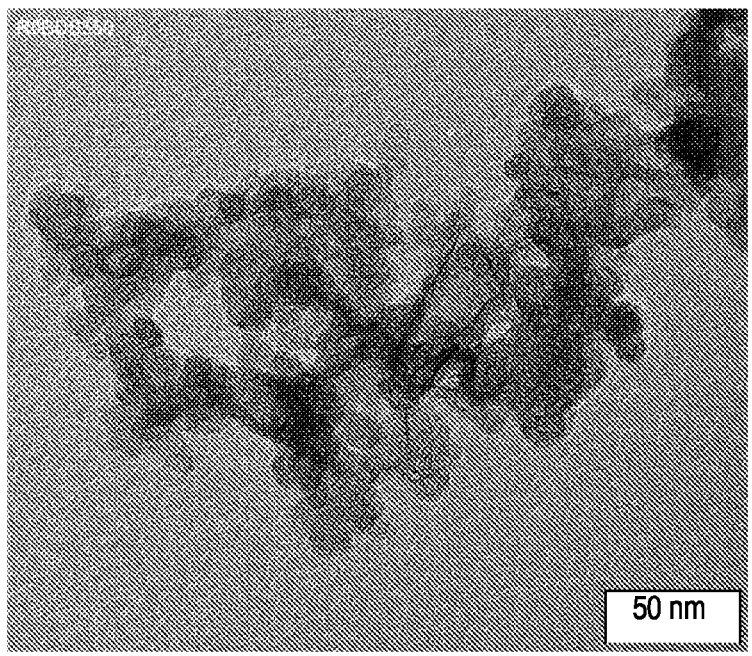

Example 1 was repeated, except n-hexane was used as the feed material (commercially available from Alfa Aesar, Ward Hill, Mass.). The solid material collected was 30 weight percent of the feed material, corresponding to a 30 percent yield. Raman and TEM analysis of particle morphology as shown in FIGS. 18-20 indicates the particles do not have a graphenic layer structure.

EXAMPLE 9

Example 1 was repeated, except that solid naphalene particles was used as the feed material (commercially available from Alfa Aesar, Ward Hill, Mass.). Raman and TEM analysis of particle morphology indicates the particles do not have a graphenic layer structure.

EXAMPLE 10

Example 1 was repeated, except benzene was used as the feed material (commercially available from Alfa Aesar, Ward Hill, Mass.). The solid material collected was 67 weight percent of the feed material, corresponding to a 67 percent yield. Raman and TEM analysis of particle morphology indicates the particles do not have a graphenic layer structure.

EXAMPLE 11

Figure 21:
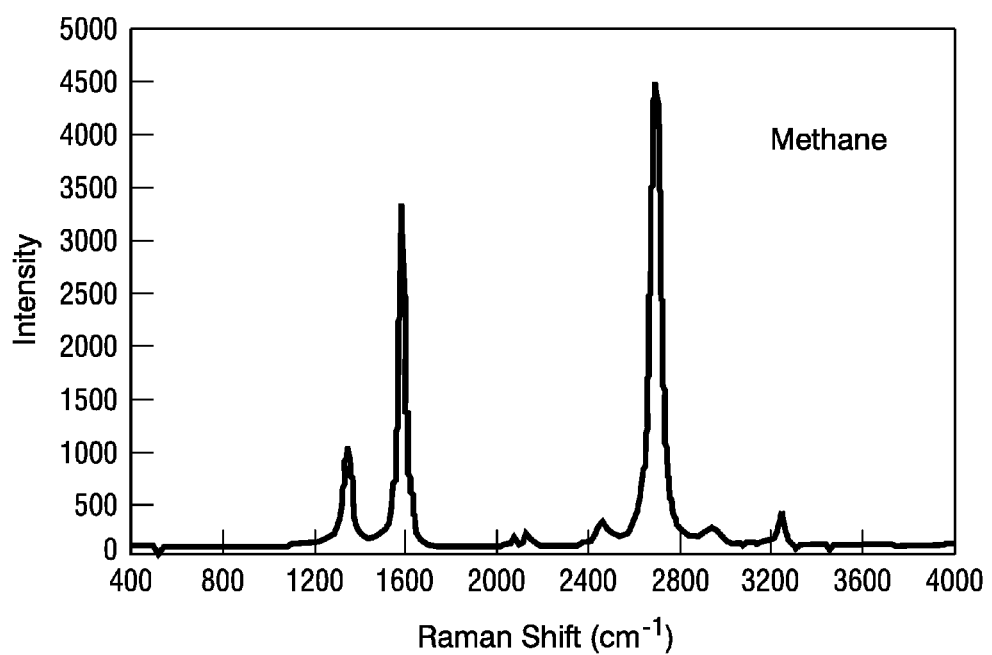
FIG. 21 is a plot of Raman shift versus reflectance for a sample of graphenic carbon particles produced from a methane precursor material in accordance with an embodiment of the present invention.
Figure 22:
FIG. 22 is a TEM micrograph of the graphenic carbon particles corresponding to FIG. 21.

Graphenic carbon particles were produced using a DC thermal plasma reactor system similar to that shown in FIG. 2. The main reactor system included a DC plasma torch (Model SG-100 Plasma Spray Gun commercially available from Praxair Technology, Inc., Danbury, Conn.) operated with 60 standard liters per minute of argon carrier gas and 26 kilowatts of power delivered to the torch. Methane precursor gas, commercially available from Airgas Great Lakes, Independent, Ohio, was fed to the reactor at a rate of 5 standard liters per minute about 0.5 inch downstream of the plasma torch outlet. Following a 14 inch long reactor section, a plurality of quench stream injection ports were provided that included 6⅛ inch diameter nozzles located 60° apart radially. Quench argon gas was injected through the quench stream injection ports at a rate of 185 standard liters per minute. The produced particles were collected in a bag filter. The total solid material collected was 75 weight percent of the feed material, corresponding to a 100 percent carbon conversion efficiency. Analysis of particle morphology using Raman analysis and high resolution transmission electron microscopy (TEM) indicates the formation of a graphenic layer structure with average thickness of less than 3.6 nm. The Raman plot shown in FIG. 21 demonstrates that graphenic carbon particles were formed by virtue of the sharp and tall peak at 2692 on the plot versus shorter peaks at 1348 and 1580. The TEM image of FIG. 22 shows the thin plate-like graphenic particles. The measured B.E.T. specific surface area of the produced material was 270 square meters per gram using a Gemini model 2360 analyzer available from Micromeritics Instrument Corp., Norcross, Ga.

It is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

It will be readily appreciated by those skilled in the art that modifications may be made to the invention without departing from the concepts disclosed in the foregoing description.

Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A method for making graphenic carbon particles comprising:
    introducing a hydrocarbon precursor material capable of forming a two-carbon-fragment species or a hydrocarbon precursor material comprising methane into a thermal zone;
    heating the hydrocarbon precursor material in the thermal zone to a temperature greater than 3,500° C. to form the graphenic carbon particles from the hydrocarbon precursor material; and
    collecting the graphenic carbon particles, wherein the graphenic carbon particles have an average aspect ratio of greater than 3:1, and a B.E.T. specific surface area of at least 50 square meters per gram.

2. The method of claim 1, wherein the hydrocarbon precursor material comprises n-propanol, ethane, ethylene, acetylene, vinyl chloride, 1,2-dichloroethane, allyl alcohol, propionaldehyde or vinyl bromide.

3. The method of claim 1, wherein the hydrocarbon precursor material comprises n-propanol.

4. The method of claim 1, where the hydrocarbon precursor material comprises methane.

5. The method of claim 1, wherein the thermal zone is in a substantially inert atmosphere.

6. The method of claim 1, wherein the thermal zone comprises a plasma.

7. The method of claim 6, further comprising introducing an inert gas into the plasma.

8. The method of claim 7, wherein the inert gas and hydrocarbon precursor material are introduced into the plasma together.

9. The method of claim 7, wherein the inert gas is introduced into the plasma separately from the hydrocarbon precursor.

10. The method of claim 7, wherein the inert gas comprises argon, hydrogen, helium or nitrogen.

11. The method of claim 1, wherein the graphenic carbon particles have an average of 30 or less carbon atom layers.

12. The method of claim 1, wherein the graphenic carbon particles have a thickness of less than 10 nm.

13. The method of claim 1, wherein the collected graphenic particles have a weight that is at least 10 percent of the weight of the hydrocarbon precursor material.

14. The method of claim 1, wherein the graphenic carbon particles have a B.E.T. specific surface area of from 70 to 1,000 square meters per gram.

15. The method of claim 1, wherein the graphenic carbon particles have a Raman spectroscopy 2D/G peak ratio of at least 1.1.

* * * * *